(12) United States Patent
Liang

(10) Patent No.: US 9,310,000 B2
(45) Date of Patent: Apr. 12, 2016

(54) RETRACTABLE PIPE STRUCTURE

(71) Applicant: Tsang-Fu Liang, Changhua (TW)

(72) Inventor: Tsang-Fu Liang, Changhua (TW)

(73) Assignee: Newbud Industrial Corp., Changhua (TW)

( * ) Notice: Subject to any disclaimer, the term of this patent is extended or adjusted under 35 U.S.C. 154(b) by 30 days.

(21) Appl. No.: 14/263,716

(22) Filed: Apr. 28, 2014

(65) Prior Publication Data

US 2015/0308590 A1 Oct. 29, 2015

(51) Int. Cl.
*F16L 33/00* (2006.01)
*F16L 11/20* (2006.01)
*F16L 11/12* (2006.01)
*F16L 33/22* (2006.01)

(52) U.S. Cl.
CPC ............. *F16L 11/20* (2013.01); *F16L 11/12* (2013.01); *F16L 33/003* (2013.01); *F16L 33/224* (2013.01)

(58) Field of Classification Search
USPC ......... 285/243, 222.1–222.5, 322–324, 123.1
See application file for complete search history.

(56) References Cited

U.S. PATENT DOCUMENTS

| | | | | |
|---|---|---|---|---|
| 2,120,275 A | * | 6/1938 | Cowles | 285/222.4 |
| 2,877,027 A | * | 3/1959 | Bagnell | 285/113 |
| 3,306,637 A | * | 2/1967 | Press et al. | 285/222.1 |
| 3,675,951 A | * | 7/1972 | Morin | 285/39 |
| 4,871,196 A | * | 10/1989 | Kingsford | 285/123.1 |
| 5,498,036 A | * | 3/1996 | Kingsford | 285/123.1 |
| 2013/0113205 A1 | * | 5/2013 | Berardi | 285/123.1 |

* cited by examiner

*Primary Examiner* — Aaron Dunwoody
(74) *Attorney, Agent, or Firm* — Che-Yang Chen; Law Office of Michael Chen

(57) ABSTRACT

A retractable pipe structure may include an inner tube, an outer tube, two connectors and two locking rings. In one embodiment, the inner tube is cover by the outer tube and the connectors are disposed at both ends of the inner tube and connecting portions are inserted into both ends of the inner tube and the tightening unit is used to tighten and secure each end. When the inner tube along with the outer tube are connecting with the connecting portion of the connector and the tightening unit is disposed outside the outer tube, the restricting ring is disposed outside the outer tube and used to cover the connecting portion along with the locking ring. When a restricting ring is squeezed by the locking ring, an engaging unit is disposed outside the restricting ring to prevent the inner tube and outer tube from directly contacting with the engaging unit.

5 Claims, 9 Drawing Sheets

RETRACTABLE PIPE STRUCTURE

FIELD OF THE INVENTION

This invention relates to pipe structure, and more particularly to a retractable pipe structure.

BACKGROUND OF THE INVENTION

A conventional retractable pipe structure is shown in FIGS. 8 and 9. The pipe structure 50 has an inner tube 51 and outer tube 52, wherein the inner tube 51 is a resilient unit and the outer tube 52 is not resilient but wrinkled. Two connectors 53 are disposed at two ends of the outer tube 52 and the connector 53 has a connecting portion 531 that has a protruding end 532 at the front portion thereof and a tightening ring 533. A locking section 534 is disposed at the upper portion of the connecting portion 531 and a locking sleeve 54 is provided and has a protruding unit 541 corresponding to the protruding end 532 of the connecting portion 531. So, when assembling the pipe, the inner tube 51 is connecting with the connecting portion 531 of the connector 53 and the inner tube 51 is restricted by the protruding end 532. The tightening ring 533 covers the inner tube 51 and the outer tube 52 is outside the tightening ring 533. Finally, the locking sleeve 54 engages with the locking section 534 to secure the inner tube 51, outer tube 52 and connector 53 through the tightening ring 533 and the locking sleeve 54.

The conventional pipe structure has the following disadvantageous: when the inner tube 51 is connecting with the connecting portion 531, there is merely a tightening ring 533 outside the inner tube 51, and the outer tube 52 is only secured by the locking sleeve 54, so the structural strength is not strong and the components of the pipe may be separated when in use.

Furthermore, when the inner tube 51 is connecting with the connecting portion 531, it is secured by the tightening ring 533. When the outer tube 52 is tightened by the tightening ring 533, the tightening ring 533 surface is squeezed by the protruding unit 541 of the locking sleeve 54, so the inner tube 51 and outer tube 52 are both squeezed by the protruding unit 541. When the inner tube and outer tube are pulled to extend, the walls of the inner and outer tubes become thinner, and the inner tube and outer tube make be broken under this situation.

Also, the outer tube 52 has no resilience so when the inner tube 51 sustains the water pressure to expand to cause the outer tube 52 to increase its length, the water flow is restricted after flowing to the inner tube 10 and the water pressure drops. Therefore, there remains a need for a new and improved pipe structure to overcome the problems stated above.

SUMMARY OF THE INVENTION

As stated above, the conventional pipe structure has the following disadvantageous: when the inner tube is connecting with the connecting portion, there is merely a tightening ring outside the inner tube, and the outer tube is only secured by the locking sleeve, so the structural strength is not strong and the components of the pipe may be separated when in use.

Furthermore, when the inner tube is connecting with the connecting portion, it is secured by the tightening ring. When the outer tube is tightened by the tightening ring, the tightening ring surface is squeezed by the protruding unit of the locking sleeve, so the inner tube and outer tube are both squeezed by the protruding unit. When the inner tube and outer tube are pulled to extend, the walls of the inner and outer tubes become thinner, and the inner tube and outer tube make be broken under this situation.

Also, the outer tube has no resilience so when the inner tube sustains the water pressure to expand to cause the outer tube to increase its length, the water flow is restricted after flowing to the inner tube and the water pressure drops.

In order to solve the problems stated above, the present invention provides a retractable pipe structure that may include an inner tube, an outer tube, two connectors and two locking rings. The inner tube is a resilient tube that can be extended and retracted. Diameter of the outer tube is larger than the inner tube and covers the inner tube. The outer tube is also resilient and compressed to a wrinkled unit, and after being extended, the length of the outer tube is larger than the original length of the inner tube. Two connectors are disposed at the ends of the inner tube and outer tube, and each of the two connectors has a connecting portion for the ends of the inner tube. An outer surface of the connecting portion has a circular recessed slot, and the connecting portion has a resilient tightening unit and a restricting ring, wherein an inner wall of the restricting ring has a circular engaging unit, and an outer wall thereof has a plurality of resilient slots. The connecting portion also has a screw section and each of the connectors has a restricting protruding unit. One connector has a connecting ring with inner threads and the connecting ring is disposed against the restricting protruding unit, and a securing piece is disposed inside the connecting ring to clamp the restricting protruding unit. A hollow threaded rod is formed above the restricting protruding unit of the other connector. Each of the two locking rings has a threaded section with an inner thread corresponding to the screw section of the connector, and forms a squeezing portion corresponding to the restricting ring.

Comparing with conventional arts, the present invention is advantageous because the present invention provides a tightening unit in addition to the connecting portion of the connector, and when the inner tube and the outer tube are connected with the connecting portion of the connector, the tightening unit can be used to increase the engaging strength of the inner tube, outer tube and connecting portion, namely reducing the concerns that the inner tube and outer tube may be separated from the connecting portion.

Furthermore, when the inner tube along with the outer tube are connecting with the connecting portion of the connector, and the tightening unit is disposed outside the outer tube, the restricting ring is disposed outside the outer tube and used to cover the connecting portion along with the locking ring. When the restricting ring is squeezed by the locking ring, the engaging unit is disposed outside the restricting ring to prevent the inner tube and outer tube from directly contacting with the engaging unit, so the inner tube and outer tube will not be damaged and can be used for a longer period of time.

Also, the inner tube and outer tube are both resilient tubes and that is why the outer tube can extend with the expansion of the inner tube. So, the water pressure will not be significantly reduced by the restriction of the inner tube and the outer tube can effectively extend.

DETAILED DESCRIPTION OF THE INVENTION

Figure 1:
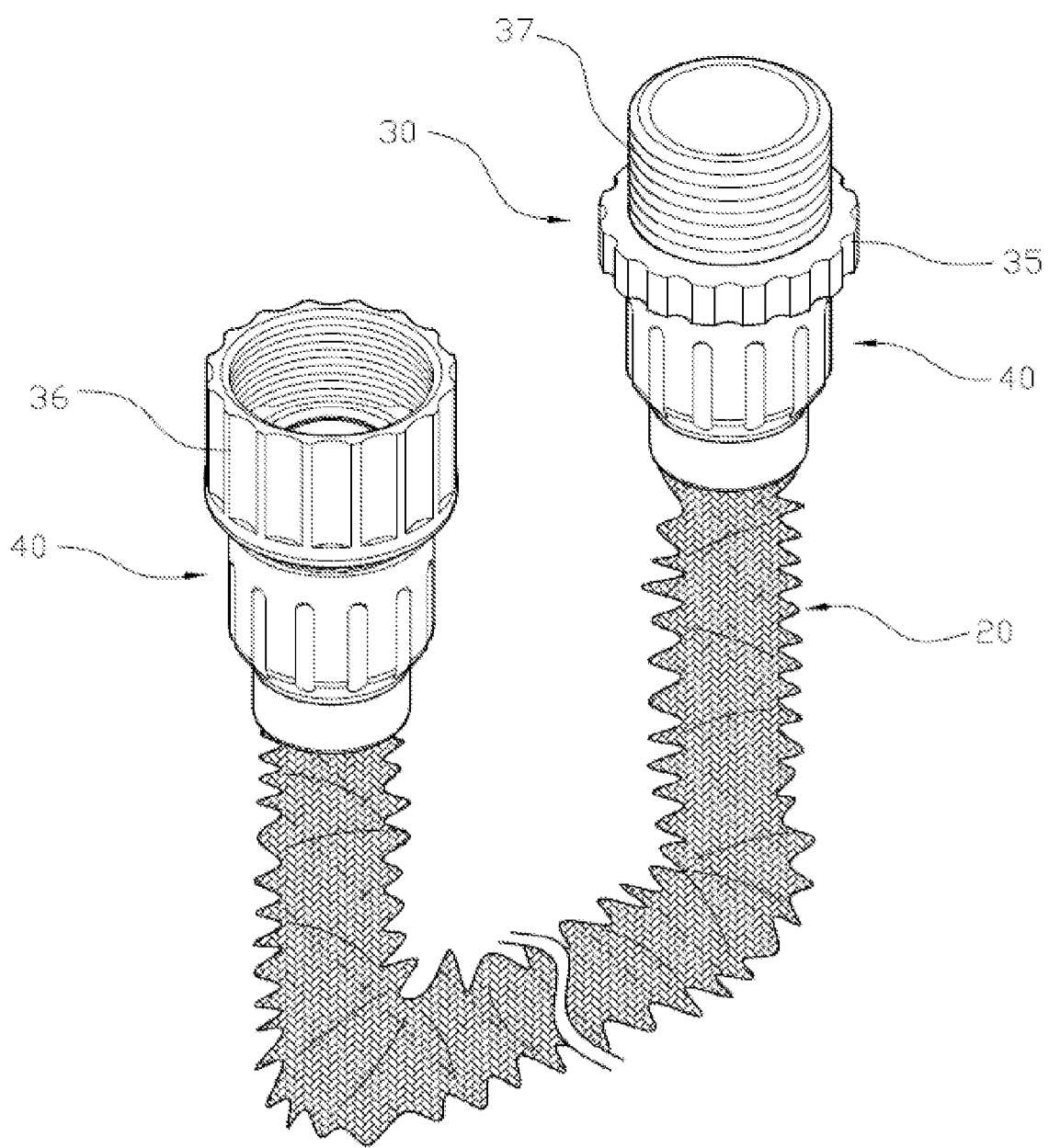
FIG. 1 illustrates a three-dimensional view of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 4, a retractable pipe structure may include an inner tube 10, an outer tube 20, two connectors 30 and two locking rings 40. The inner tube 10 is a resilient tube that can be extended and retracted. Diameter of the outer tube 20 is larger than the inner tube 10 and covers the inner tube 10. The outer tube 20 is also resilient and compressed to a wrinkled unit, and after being extended, the length of the outer tube 20 is larger than the original length of the inner tube 10. Two connectors 30 are disposed at the ends of the inner tube 10 and outer tube 20, and each of the two connectors 30 has a connecting portion 31 for the ends of the inner tube 10. An outer surface of the connecting portion 31 has a circular recessed slot 311, and the connecting portion 31 has a resilient tightening unit 32 and a restricting ring 33, wherein an inner wall of the restricting ring 33 has a circular engaging unit 331, and an outer wall thereof has a plurality of resilient slots 332. The connecting portion 31 also has a screw section 34 and each of the connectors 30 has a restricting protruding unit 35. One of the two connectors 30 has a connecting ring 36 with inner threads and the connecting ring 36 is disposed against the restricting protruding unit 35, and a securing piece 361 is disposed inside the connecting ring 36 to clamp the restricting protruding unit 35. A hollow threaded rod 37 is formed above the restricting protruding unit 35 of the other connector 30. Each of the two locking rings 40 has a threaded section 41 with an inner thread corresponding to the screw section 34 of the connector 30, and forms a squeezing portion 42 corresponding to the restricting ring 33.

Figure 2:
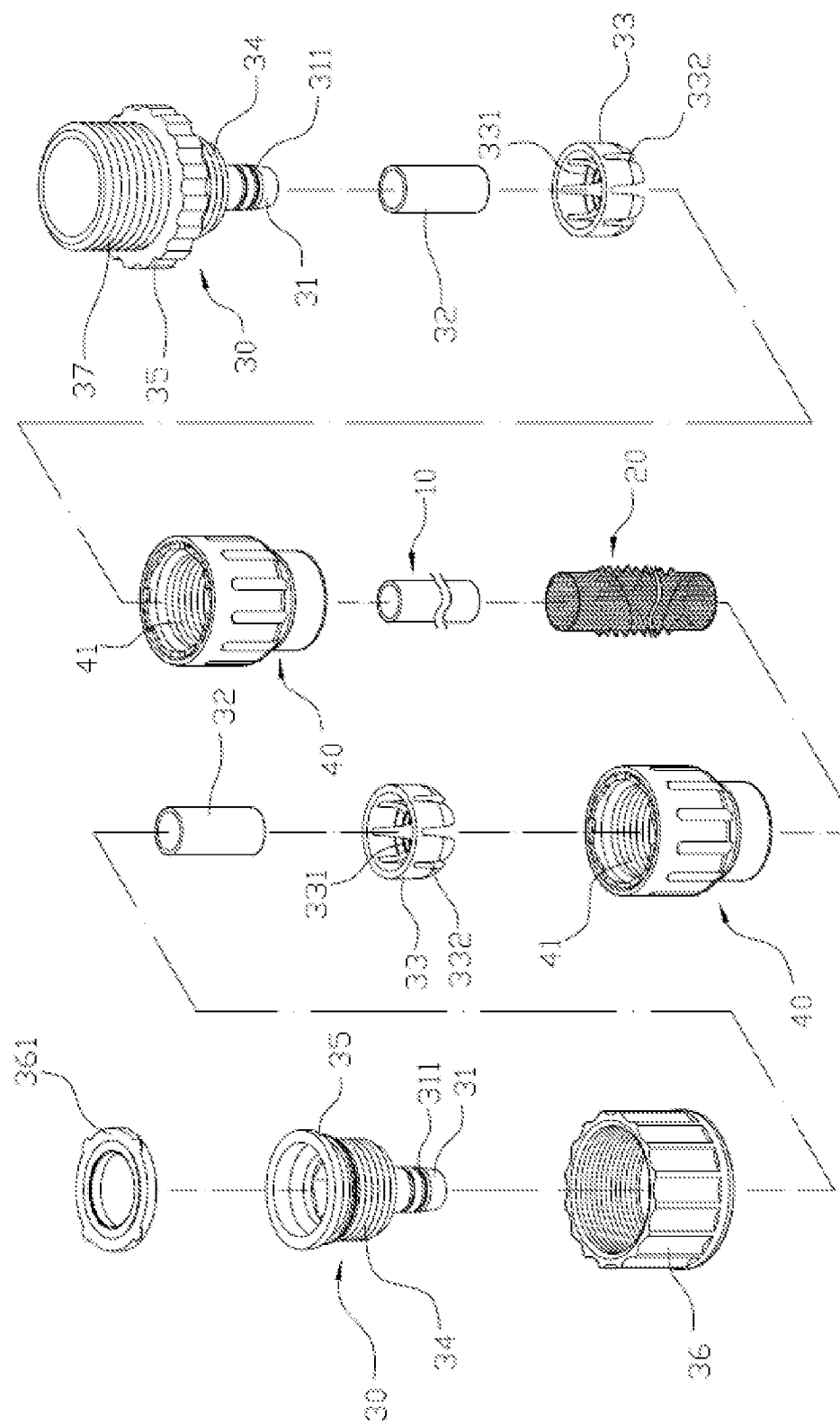
FIG. 2 illustrates an exploded view of the present invention.
Figure 3:
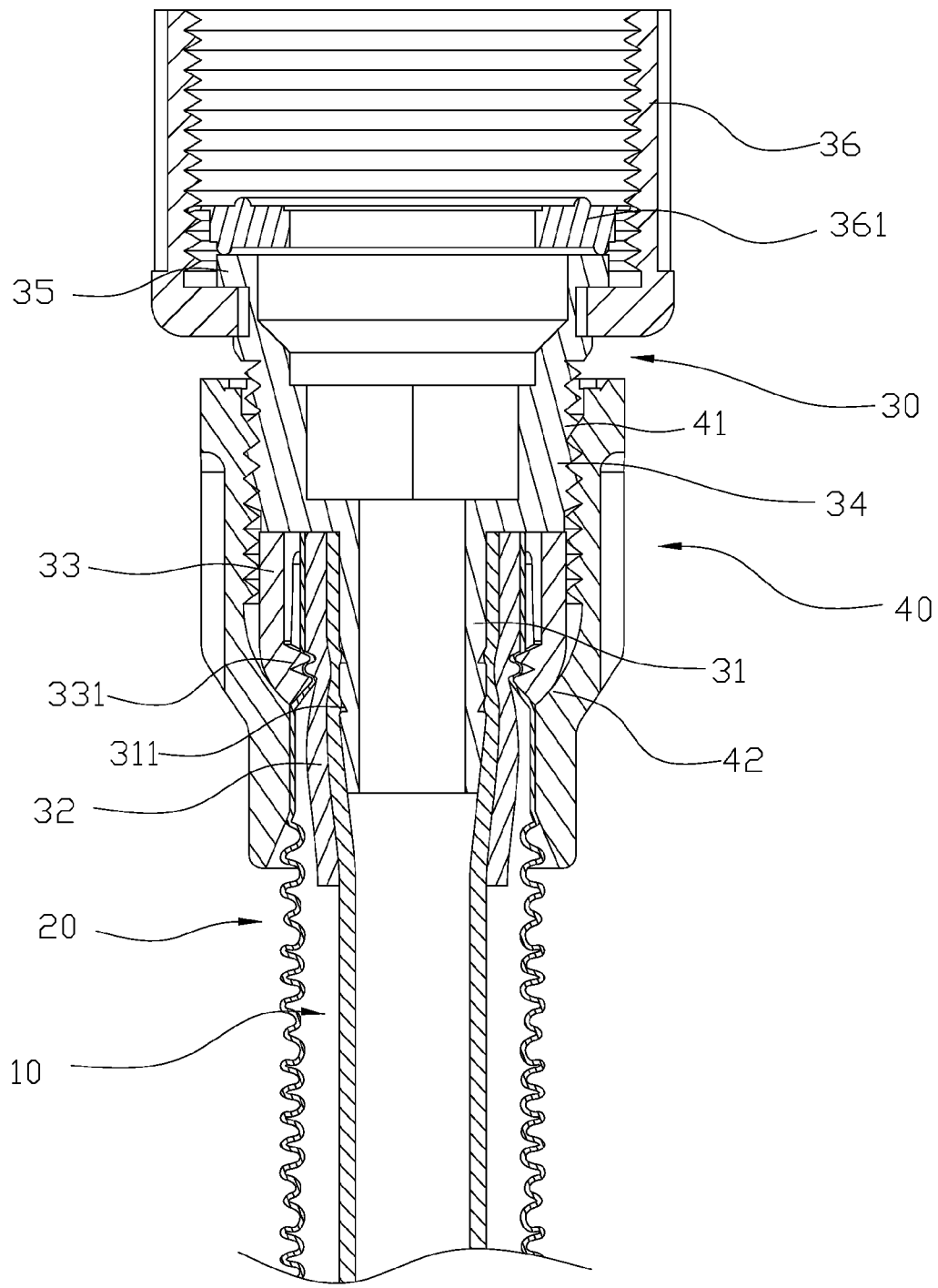
FIG. 3 illustrates a sectional view of one connector in the present invention.
Figure 4:
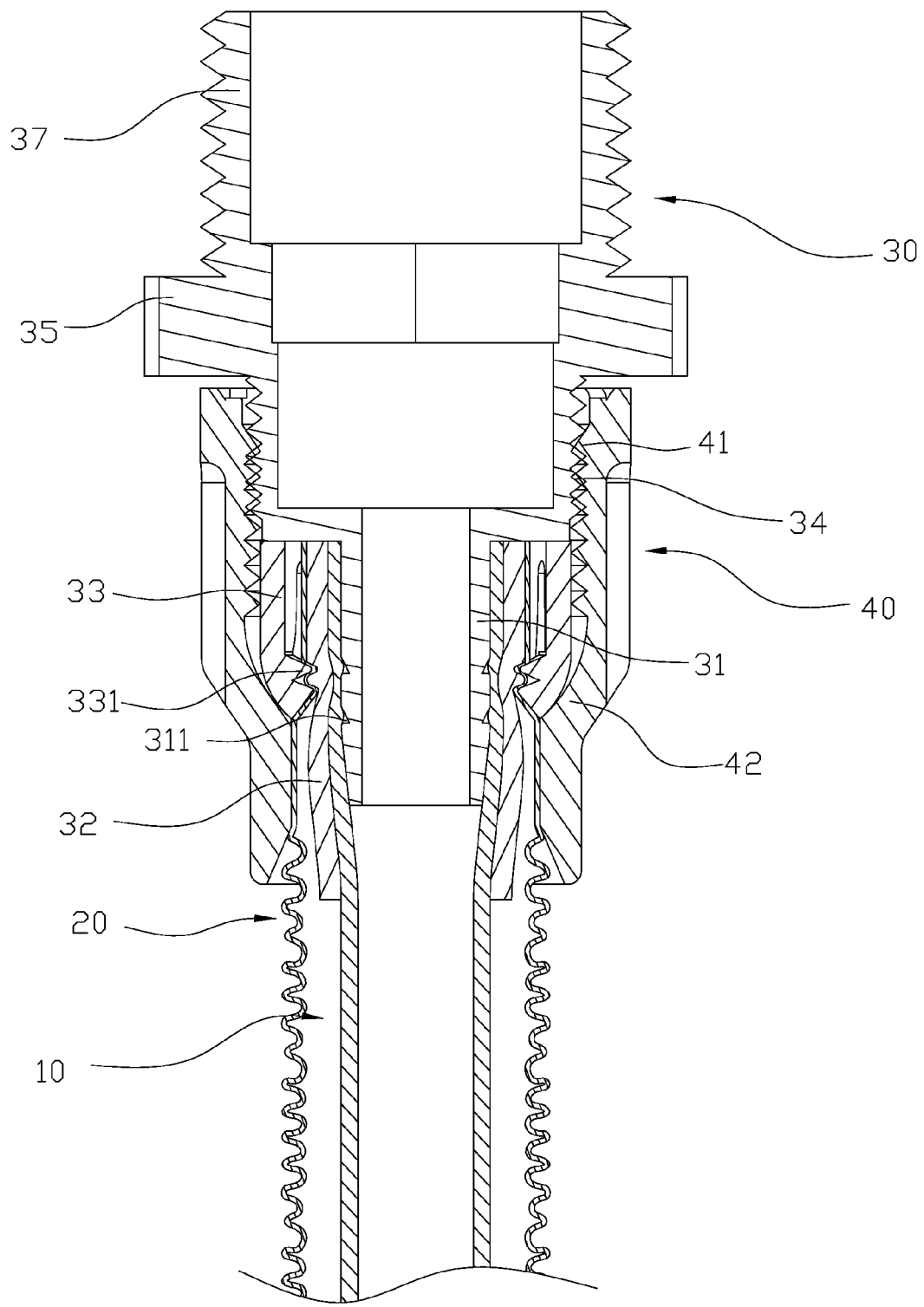
FIG. 4 illustrates a sectional view of the other connector in the present invention.

Referring to FIGS. 2 to 4, the inner tube 10 is cover by the outer tube 20 and the connectors 30 are disposed at both ends of the inner tube 10, and the connecting portions 31 are inserted into both ends of the inner tube 10 and the tightening unit 32 is used to tighten and secure each end. An inner diameter of the tightening unit 32 is larger than the outer diameter of the inner tube 10, and when the inner tube 10 is connecting with the connecting portion 31 of the connector 30, the tightening unit 32 is disposed outside the inner tube 10 and used to tighten and secure the connecting portion 31 of the connector 30. The outer tube 20 is then disposed outside to cover the inner tube 10 and meanwhile, the restricting ring 33 is disposed outside the outer tube 20 and used to cover the connecting portion 31. The threaded section 41 of the locking ring 40 is corresponding to the screw section 34 of the connector 30, and when the locking ring 40 is gradually inserted into the screw section 34, the squeezing portion 42 is used to compress the restricting ring 33, so the restricting ring 33 can be pushed further inside due to the resilient slots 332 and the engaging unit 331 moves inside to push the outer tube 20, tightening unit 32 and inner tube 10. Thus, the inner tube 10 engages with the recessed slot 311 of the connecting portion 31 to increase the engaging strength of the inner tube 10, outer tube 20 and connectors 30. Furthermore, because of the coverage provided by the tightening unit 32, the inner tube 10 will not be directly contacted by the engaging unit 331 of the restricting ring 33, so the inner tube 10 will not be damaged and can be used for a longer period of time.

Figure 5:
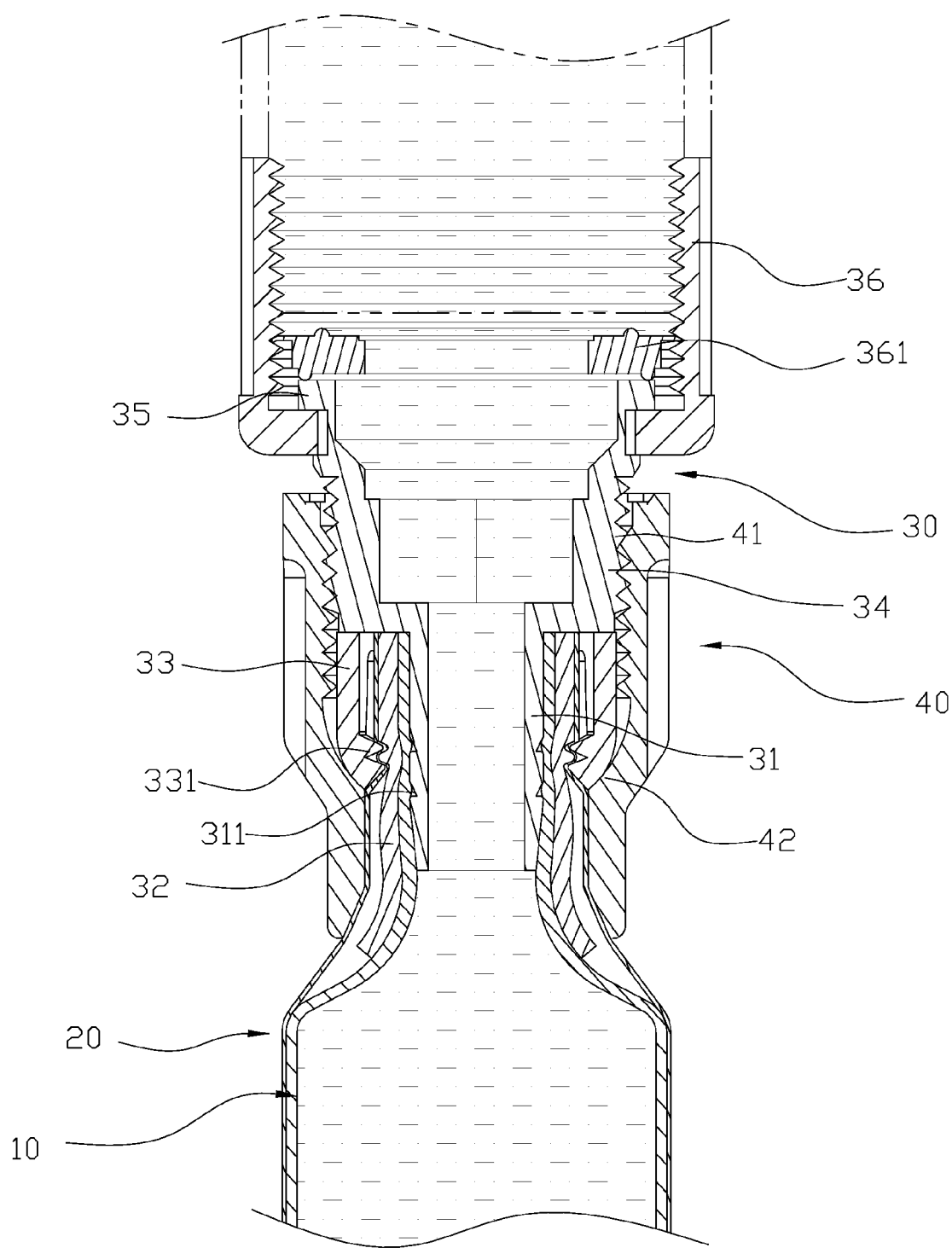
FIG. 5 illustrates a schematic view of the present invention when in use.

Referring to FIG. 5, one connector 30 is connected to a water source with the connecting ring 36, so the water can flow into the inner tube 10 through the connecting ring 36 and the water pressure can be used to expand the inner tube 10. Furthermore, the length of the wrinkled outer tube 20 would be increased due to the expansion of the inner tube 10. The inner tube 10 and outer tube 20 are both resilient tubes and that is why the outer tube can extend with the expansion of the inner tube 10. So, the water pressure will not be significantly reduced by the restriction of the inner tube 10 and the outer tube 20 can effectively extend.

Figure 6:
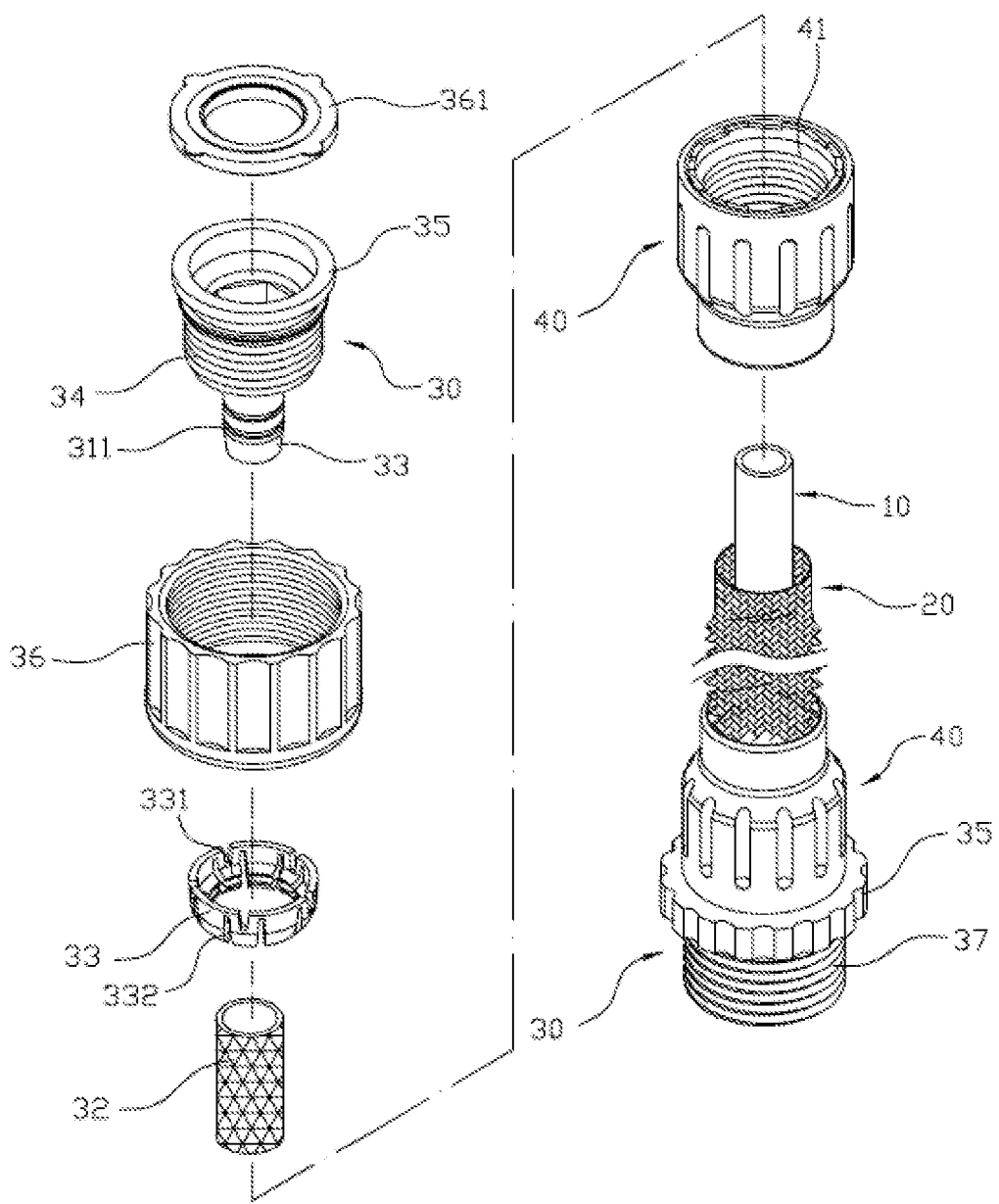
FIG. 6 illustrates an exploded view of another embodiment in the present invention.
Figure 7:
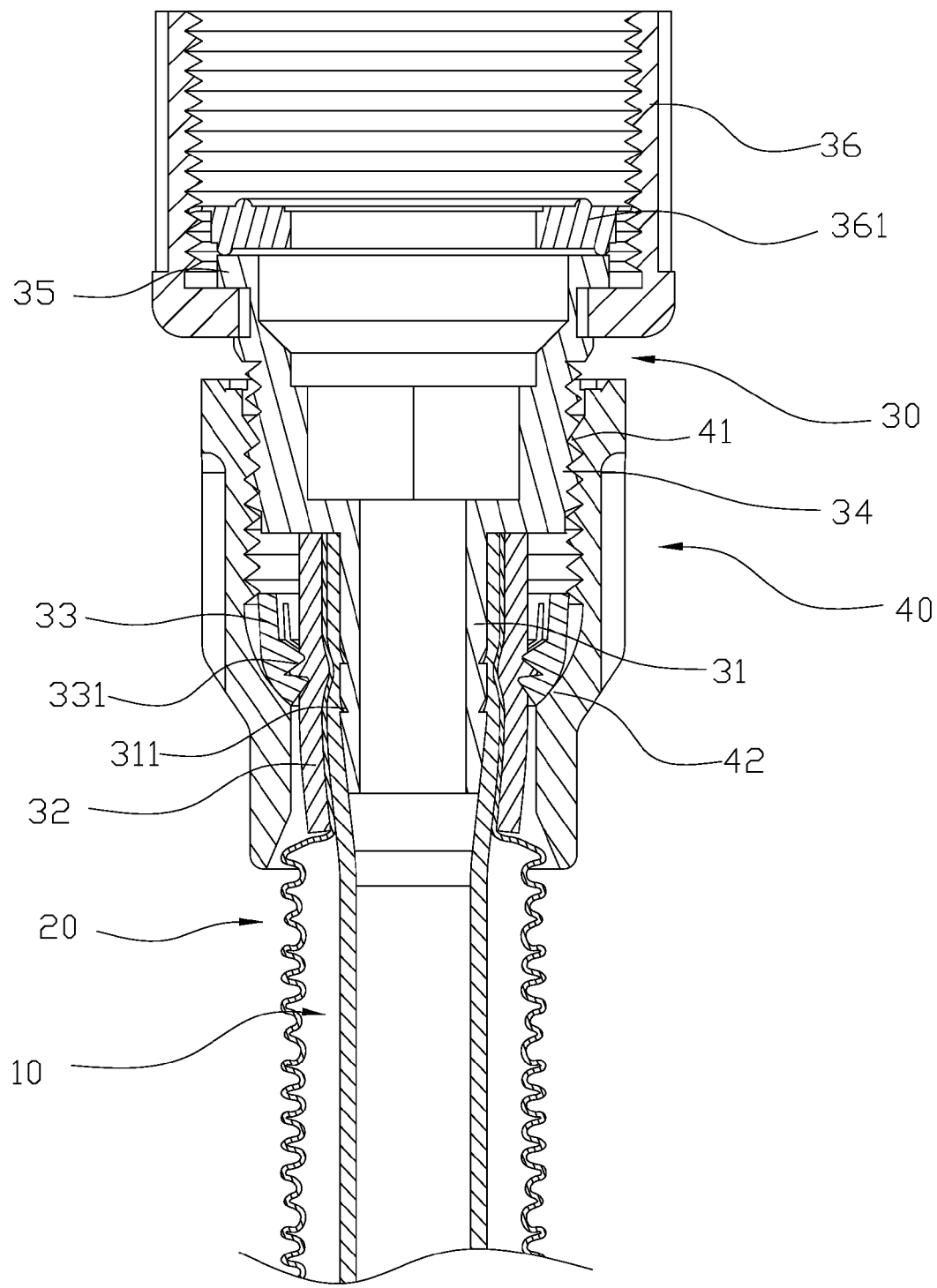
FIG. 7 illustrates a sectional view of another embodiment in the present invention.
Figure 8:
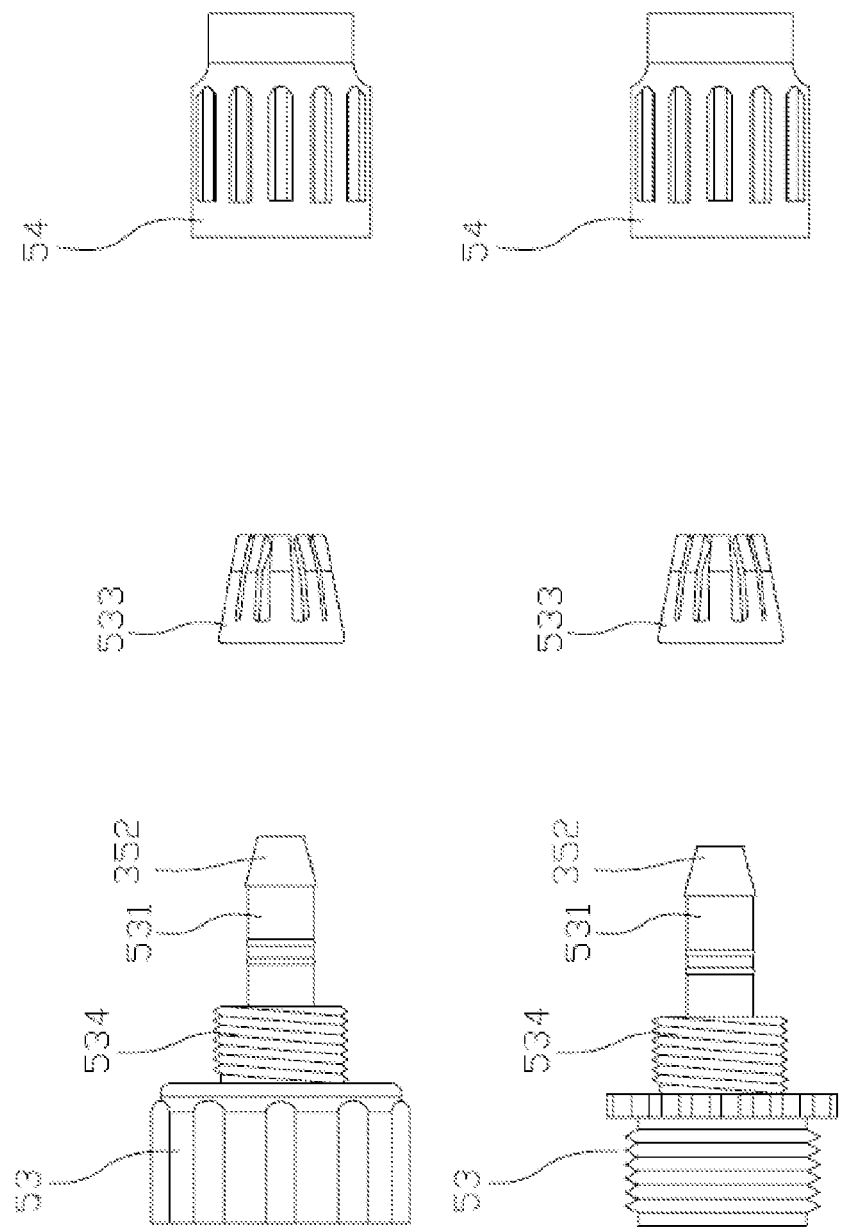
FIG. 8 is an exploded view of a prior art.
Figure 9:
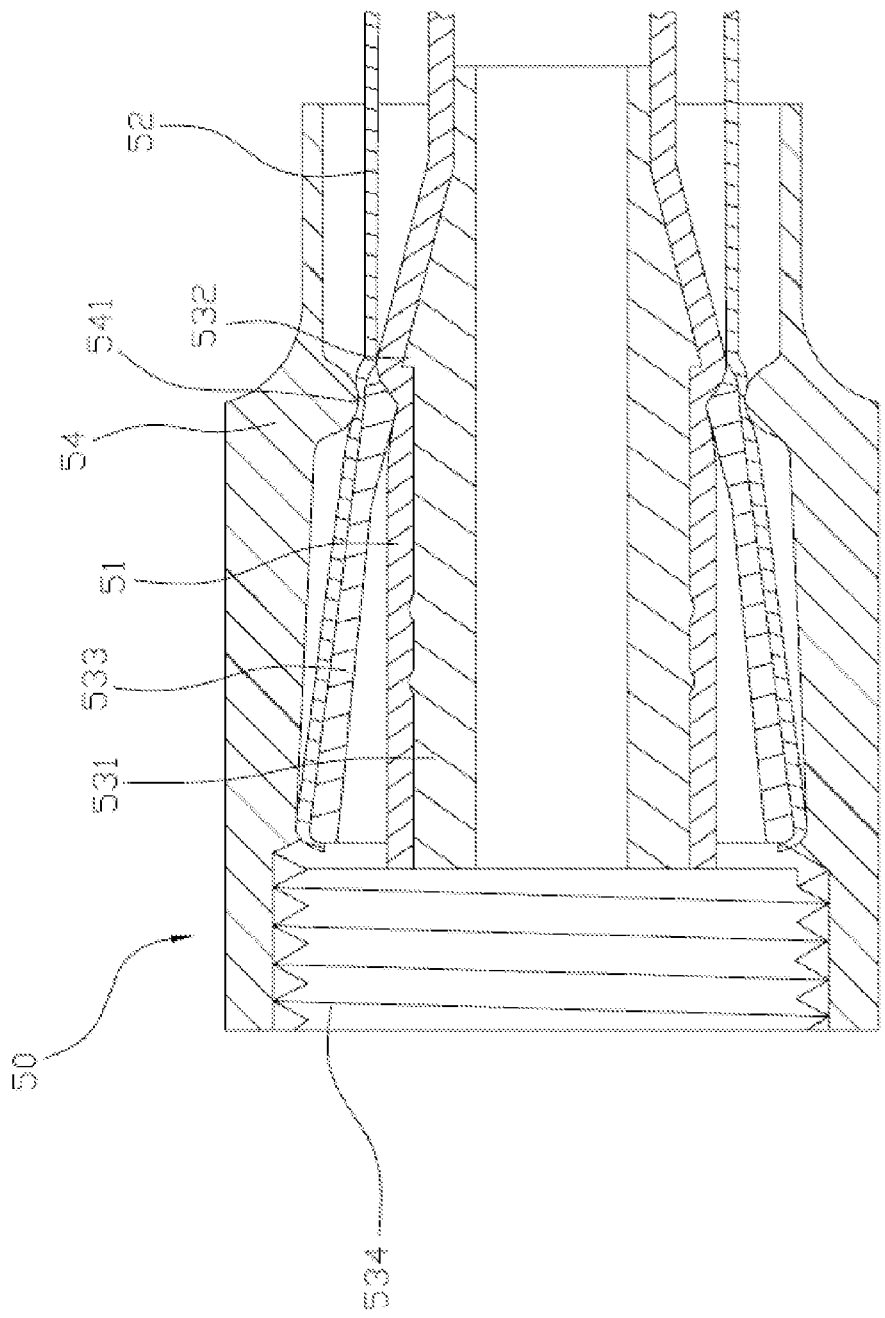
FIG. 9 is a sectional view of the prior art.

In another embodiment shown in FIGS. 6 and 7, the inner tube 10 is covered by the outer tube 20 and has the connectors 30 at both ends thereof, and the two connectors 30 are connected to both ends of the inner tube 10 through the connecting portion 31 and the tightening unit 32 is used to further secure each end. An inner diameter of the tightening unit 32 is larger than the outer diameter of the inner tube 10, and when the inner tube 10 along with the outer tube 20 are connecting with the connecting portion 31 of the connector 30, the tightening unit 32 is disposed outside the outer tube 20 and used to tighten and secure the connecting portion 31 of the connector 30. Meanwhile, the restricting ring 33 is disposed outside the outer tube 20 and used to cover the connecting portion 31. The threaded section 41 of the locking ring 40 is corresponding to the screw section 34 of the connector 30, and when the locking ring 40 is gradually inserted into the screw section 34, the squeezing portion 42 is used to compress the restricting ring 33, so the restricting ring 33 can be pushed further inside due to the resilient slots 332 and the engaging unit 331 moves inside to push the outer tube 20, tightening unit 32 and inner tube 10. Thus, the inner tube 10 engages with the recessed slot 311 of the connecting portion 31 to increase the engaging strength of the inner tube 10, outer tube 20 and connectors 30. Furthermore, because of the coverage provided by the tightening unit 32, the inner tube 10 and outer tube 20 will not be directly contacted by the engaging unit 331 of the restricting ring 33, so the inner tube 10 and outer tube 20 will not be damaged and can be used for a longer period of time.

According to the embodiments discussed above, the present invention is advantageous because the present invention provides a tightening unit 32 in addition to the connecting portion 31 of the connector 30, and when the inner tube 10 and the outer tube 20 are connected with the connecting portion 31 of the connector 30, the tightening unit 32 can be used to increase the engaging strength of the inner tube 10, outer tube 20 and connecting portion 31, namely reducing the concerns that the inner tube 10 and outer tube 20 may be separated from the connecting portion 31.

Furthermore, when the inner tube 10 along with the outer tube 20 are connecting with the connecting portion 31 of the connector 30, and the tightening unit 32 is disposed outside the outer tube 20, the restricting ring 33 is disposed outside the outer tube 20 and used to cover the connecting portion along with the locking ring 40. When the restricting ring 33 is squeezed by the locking ring 40, the engaging unit 331 is disposed outside the restricting ring 33 to prevent the inner tube 10 and outer tube 20 from directly contacting with the engaging unit 331, so the inner tube 10 and outer tube 20 will not be damaged and can be used for a longer period of time.

Also, the inner tube 10 and outer tube 20 are both resilient tubes and that is why the outer tube can extend with the expansion of the inner tube 10. So, the water pressure will not be significantly reduced by the restriction of the inner tube 10 and the outer tube 20 can effectively extend.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A retractable pipe structure comprising:
   an inner tube that is resilient and is configured to be extended and retracted;
   an outer tube, a diameter thereof greater than the inner tube and covering the inner tube, wherein the outer tube is resilient and compressed to a wrinkled unit, and after being extended, length of the outer tube is greater than an original length of the inner tube;
   two connectors, disposed at the both ends of the inner tube and outer tube, and each of the two connectors having a connecting portion for the ends of the inner tube and outer tube, the connecting portion having a resilient tightening unit and a restricting ring, wherein an inner wall of the restricting ring has a circular engaging unit, and an outer wall thereof has a plurality of resilient slots, and the connecting portion further includes a screw section and a connecting ring; and
   two locking rings, each of which having a threaded section with an inner thread corresponding to the screw section of the connector, and forming a squeezing portion corresponding to the restricting ring.

2. The retractable pipe structure of claim 1, wherein each of the connectors has a restricting protruding unit, and one of the connectors has a connecting ring with inner threads and the connecting ring is disposed against the restricting protruding unit, and a securing piece is disposed inside the connecting ring to clamp the restricting protruding unit, and a hollow threaded rod is formed above the restricting protruding unit of the other connector.

3. The retractable pipe structure of claim 1, wherein an outer surface of the connecting portion has a circular recessed slot.

4. The retractable pipe structure of claim 1, wherein an inner diameter of the tightening unit is greater than an outer diameter of the inner tube, and when the inner tube is connecting with the connecting portion of the connector, the tightening unit is disposed outside the inner tube and used to tighten and secure the connecting portion of the connector.

5. The retractable pipe structure of claim 1, wherein an inner diameter of the tightening unit is greater than an outer diameter of the inner tube, and when the inner tube is connecting with the connecting portion of the connector, the tightening unit is used to cover the outer tube to secure both the inner tube and outer tube at the connecting portion of the connector.

\* \* \* \* \*